(12) United States Patent
Xia et al.

(10) Patent No.: US 9,972,057 B2
(45) Date of Patent: May 15, 2018

(54) DETERMINING A USER'S RANK IN A SOCIAL NETWORK

(71) Applicant: Microsoft Technology Licensing, LLC, Redmond, WA (US)

(72) Inventors: Jinchun Xia, San Jose, CA (US); Jacob Kessler, Mountain View, CA (US); Elaine Chien, Santa Clara, CA (US); Zhijun Chen, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 396 days.

(21) Appl. No.: 14/663,383

(22) Filed: Mar. 19, 2015

(65) Prior Publication Data
US 2016/0275080 A1    Sep. 22, 2016

(51) Int. Cl.
| | | |
|---|---|---|
| G06F 17/30 | (2006.01) | |
| G06Q 50/00 | (2012.01) | |
| H04L 12/24 | (2006.01) | |
| H04L 29/08 | (2006.01) | |

(52) U.S. Cl.
CPC ......... *G06Q 50/01* (2013.01); *H04L 41/0893* (2013.01); *H04L 67/306* (2013.01)

(58) Field of Classification Search
CPC .......... G06F 17/3053; G06F 17/30598; H04L 67/306; H04L 41/0893; G06Q 50/01
USPC ....................................................... 707/748
See application file for complete search history.

(56) References Cited

U.S. PATENT DOCUMENTS

| | | | |
|---|---|---|---|
| 2012/0096000 A1* | 4/2012 | Azar et al. | 707/732 |
| 2012/0158720 A1* | 6/2012 | Luan | G06F 17/30867 707/732 |
| 2013/0073976 A1* | 3/2013 | McDonald | G06Q 10/00 715/739 |
| 2013/0290430 A1* | 10/2013 | Yung | H04L 67/22 709/204 |
| 2014/0136933 A1* | 5/2014 | Berger et al. | 715/202 |
| 2014/0297749 A1 | 10/2014 | Jayaram et al. | |
| 2016/0034586 A1* | 2/2016 | Makhani | 707/706 |

OTHER PUBLICATIONS

Barry, A Communoty-Based Approach to personalizing Web Search, Aug. 2007, IEEE, 42-50.*
File History for U.S. Appl. No. 14/528,643, saved on Apr. 1, 2015, 94 pages.

* cited by examiner

*Primary Examiner* — Jean B Fleurantin
(74) *Attorney, Agent, or Firm* — Hickman Palermo Becker Bingham LLP

(57) ABSTRACT

In an embodiment, a technique is disclosed herein to determine a first group of users for which a particular user is a member and automatically generate a first ranking of users in the first group. For the particular user, automatically generate one or more first action recommendations to increase rank among the users in the first group. And to a device accessible by the particular user, automatically provide a particular ranking of the particular user from among the first ranking and the one or more first action recommendations.

24 Claims, 14 Drawing Sheets

DETERMINING A USER'S RANK IN A SOCIAL NETWORK

FIELD OF THE DISCLOSURE

The present disclosure relates to techniques for facilitating increased activity on online networks, and in particular, on online professional networks.

BACKGROUND

Ranking persons in a professional context is typically based on achievements or credentials of the persons. For example, the amount of sales made by each person may be the ranking criteria by which a group of sales people can be ranked relative to each other. However, when ranking persons in a different professional context, the same achievements or credentials may not be applicable as the ranking criteria. The difficulty of accurately ranking persons in professional contexts is compounded if accuracy of information corresponding to each person is not necessarily verifiable and/or is incomplete. Unverifiable and/or incomplete information is a shortcoming of online or computerized networks that rely on persons to self-report their information.

Furthermore, while rankings provide a relative measure at a specific point in time, the rankings alone are of limited utility. It would be beneficial if the rankings served a greater purpose. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
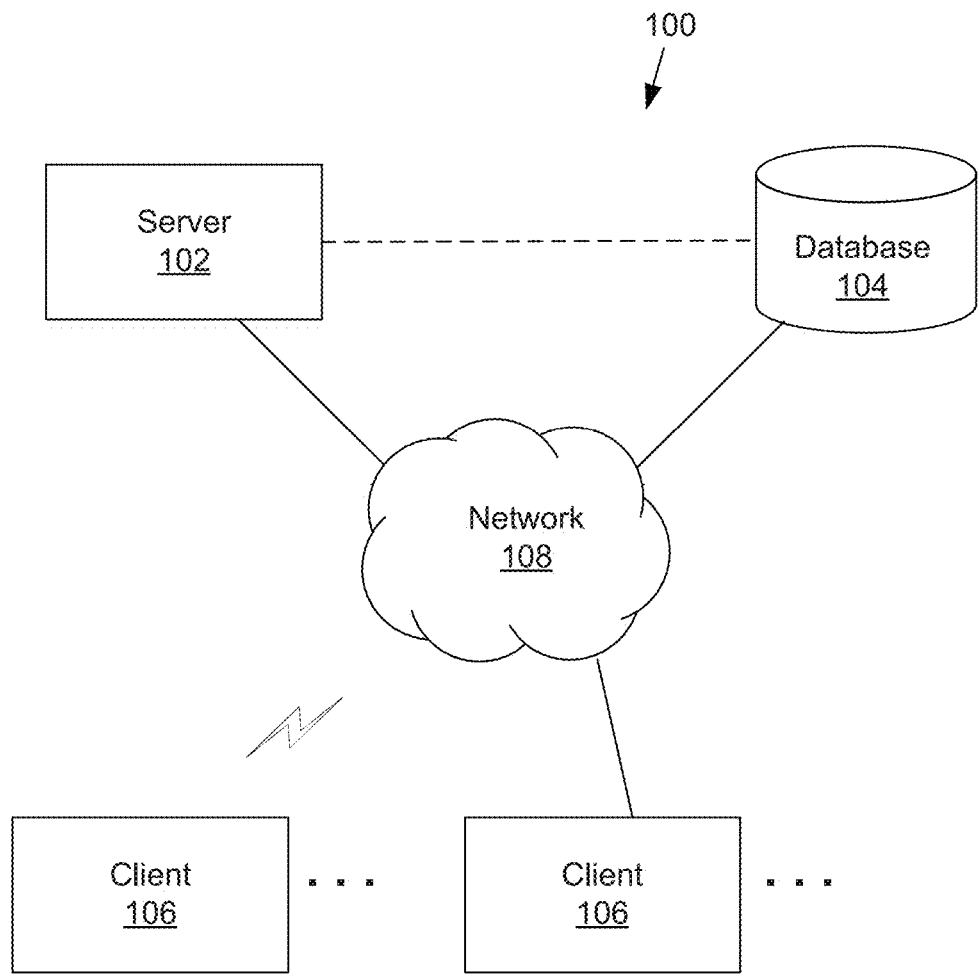
FIG. 1 illustrates an example system for determining and providing user's rank and action recommendations/items according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Various modifications to the embodiments will be readily apparent to those skilled in the art, and principles defined herein may be applied to other embodiments and applications without departing from the spirit and scope of the invention. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of embodiments with unnecessary detail. Thus, the present disclosure is not intended to be limited to the embodiments shown, but is to be accorded the widest scope consistent with the principles and features disclosed herein.

General Overview

In an embodiment, a programmatic method enables automatically ranking users within a particular group relative to each other based on a frequency or number of access/views of user profiles associated with respective users with the particular group. The access/views of user profiles occur online directly from the server or website hosting the user profiles (e.g., online social or professional network) or indirectly from third party servers or websites (e.g., news feeds, blogs, postings, news articles, etc.). One of the users within the particular group is a particular user. The particular user may also be a member of one or more other particular groups, where the ranking criteria of each of the other particular groups is the same as the ranking criteria for the particular group. Examples of the particular group and other particular groups include, but are not limited to, a connections group, a company group, and a professional peers group. The users composing each of the particular group and other particular groups may be automatically determined using the user profile information.

The programmatic method further enables automatically providing one or more action recommendations or items selected to improve the particular user's ranking if the recommended action(s) are implemented. In an embodiment, specific action recommendations or items, also referred to as specific actionable suggestions or the like, may be selected or determined in accordance with the content of the user profile corresponding to the particular user, the particular user's ranking, the particular user's account type, and/or other possible factors.

In this manner, techniques to facilitate increasing the particular user's visibility are disclosed herein. While the members of the group to be ranked are determined based on respective members' user profiles, the ranking criteria is not based on user profile information. These and other details regarding ranking and recommendation determination techniques are discussed in detail below.

Example Computer System Implementation

FIG. 1 illustrates an example system 100 in which the techniques described may be practiced, according to some embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

System 100 includes a server 102, a database 104, one or more clients 106, and a network 108. Each of the server 102, database 104, and clients 106 is in wired or wireless communication with the network 108.

Server 102 comprises one or more servers, computers, processors, database servers, and/or computing devices configured to communicate with the database 104 and/or clients 106 via network 108. Server 102 hosts one or more applications, websites, social networks, or other visual or user interface mechanisms related to techniques and data described in detail below. Server 102 may be located at one or more geographically distributed locations. Although one server 102 is shown in FIG. 1, system 100 may, depending on the embodiment, comprise one, two, or any number of servers 102, which may work alone and/or collectively to provide the functionality described herein.

Database 104 comprises one or more databases or storage devices configured to store and maintain user profiles, data associated with user profiles, data associated with use of or access to user profiles, data derived from user profiles, and/or instructions for use by server 102 and/or clients 106 as described herein. Database 104 may, in some embodiments, be located at one or more geographically distributed locations relative to server 102. Server 102 and/or clients 106 may, in some embodiments, access database 104 via network 108. Alternatively, server 102 may access database 104 without use of network 108. As another alternative, database 104 may be included within server 102. System 100 may, depending on the embodiment, comprise one, two, or any number of databases 104 configured to individually and/or collectively store the data described herein.

Clients 106 comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the clients 106 includes applications, software, and/or other executable instructions to facilitate various aspects of the ranking and recommendation techniques described herein. Clients 106 may also include additional applications or other interface capabilities to communicate with the server 102 and/or database 104. Clients 106 may, depending on the embodiment, be located geographically dispersed from each other. Although two clients 106 are shown in FIG. 1, more or less than two clients 106 may be included in system 100.

Network 108 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 108 comprises a public network, security features (e.g., VPN/SSL secure transport) may be included to ensure authorized access within system 100.

Figure 2:
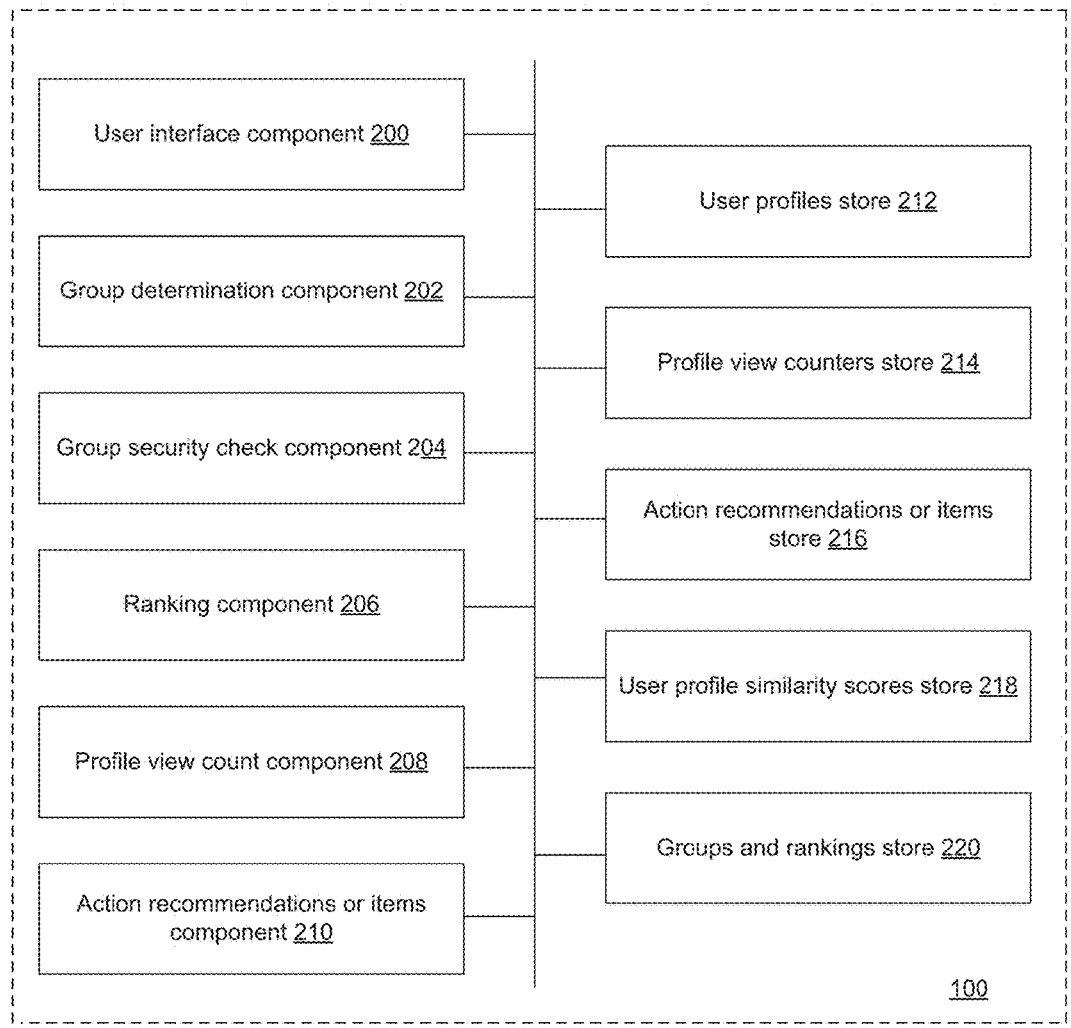
FIG. 2 illustrates example components and data included in the system of FIG. 1 according to some embodiments.

FIG. 2 illustrates example components and data that may be included in system 100 to perform ranking, count user profile views, determine groups, determine action recommendations or items, and associated functionalities, according to some embodiments. The various components and/or data of system 100 are implemented at least partially by hardware at one or more computing devices, such as one or more hardware processors executing instructions stored in one or more memories for performing various functions described herein. The components and/or data are communicatively coupled (e.g., via appropriate interfaces) to each other and to various data sources, so as to allow information to be passed between the components and/or to share and access common data. FIG. 2 illustrates only one of many possible arrangements of components and data configured to perform the functionality described herein. Other arrangements may include fewer or different components and/or data, and the division of work between the components and/or data may vary depending on the arrangement.

In an embodiment, system 100 includes a user interface component 200, a group determination component 202, a group security check component 204, a ranking component 206, a profile view count component 208, and an action recommendations or items component 210. Components 200-210 can be included in the server 102. In other embodiments, components 200-210 are included in one or more of server 102, database 104, and clients 106. For example, component 200 may be included in clients 106 and components 202-210 may be included in the server 102.

In an embodiment, system 100 further includes data such as, but not limited to, a user profile store 212, a profile view counter store 214, an action recommendations or items store 216, a user profile similarity scores store 218, and a groups and rankings store 220. Stores 212-220 can be included in the database 104.

As discussed in greater detail below, the user interface component 200 provides user interface functionalities to users interfacing with clients 106 to enable navigating to rankings, specify group(s) within which to be ranked, receive ranking history or trends over time, receive action recommendations or items, select an action recommendation or item, and the like. The group determination component 202 determines one or more groups for which a user is a member and for which members within the respective group are to be ranked relative to each other. In an embodiment, data included in the user profiles store 212 and/or user profile similarity scores store 218 may be used to determine one or more of the groups. The group security check component 204 performs one or more security checks, filtering operations, and/or confirms accuracy of rankings calculated by the ranking component 206.

Ranking component 206 ranks members of a group relative to each other based on one or more criteria. In an embodiment, rankings may be performed based on the number of unique profile views detected for each member within a group. One or more profile view counters may be maintained in the profile view counters store 214 for each user profile included in user profiles store 212. Profile view count component 208 facilitates detecting views of each user profile, maintaining viewed counter(s) for each user profile, and/or filtering invalid or false views of any user profiles. Profile view counters included in the profile view counters store 214 may include a count of the unique number of views of each user profile, associated time/date stamps, filter rules, and/or other information relating to maintaining counts of the number of views of each user profile in user profiles store 212.

In an embodiment, groups determined by group determination component 202 and/or rankings determined by ranking component 206 are stored in groups and rankings store 220. The stored groups and rankings may also be referred to as historical data, historical rankings, or the like to enable determination and presentation of changes or trends in a user's ranking(s) over time, as discussed in detail below.

The action recommendations or items component 210 determines which action recommendations or items from the action recommendations or items store 216 to provide to a user for a particular group ranking provided to the user. The selection of particular one or more of the action recommendations or items may be based on the type of account associated with the user (e.g., free or premium/paid account), current content of the user profile associated with the user, trending or popular action recommendations or items, the user's rank within the group, the type of group, and the like.

In one embodiment, components 200-210 comprise one or more software components, programs, applications, or other units of code base or instructions configured to be executed by one or more processors included in the server 102 and/or a client 106. Although components 200-210 are depicted as distinct components in FIG. 2, components 200-210 may be implemented as fewer or more components than illustrated. Data stores 212-220 may be implemented as fewer or more data stores than illustrated. Data stores 212-220 may be organized in particular data structures, data tables, data spreadsheets, relational data scheme, and the like. Any of components 200-210 or data stores 212-220 may communicate with one or more devices included in the system 100, such as server 102, database 104, or clients 106.

Example Functional Implementation

Figure 3:
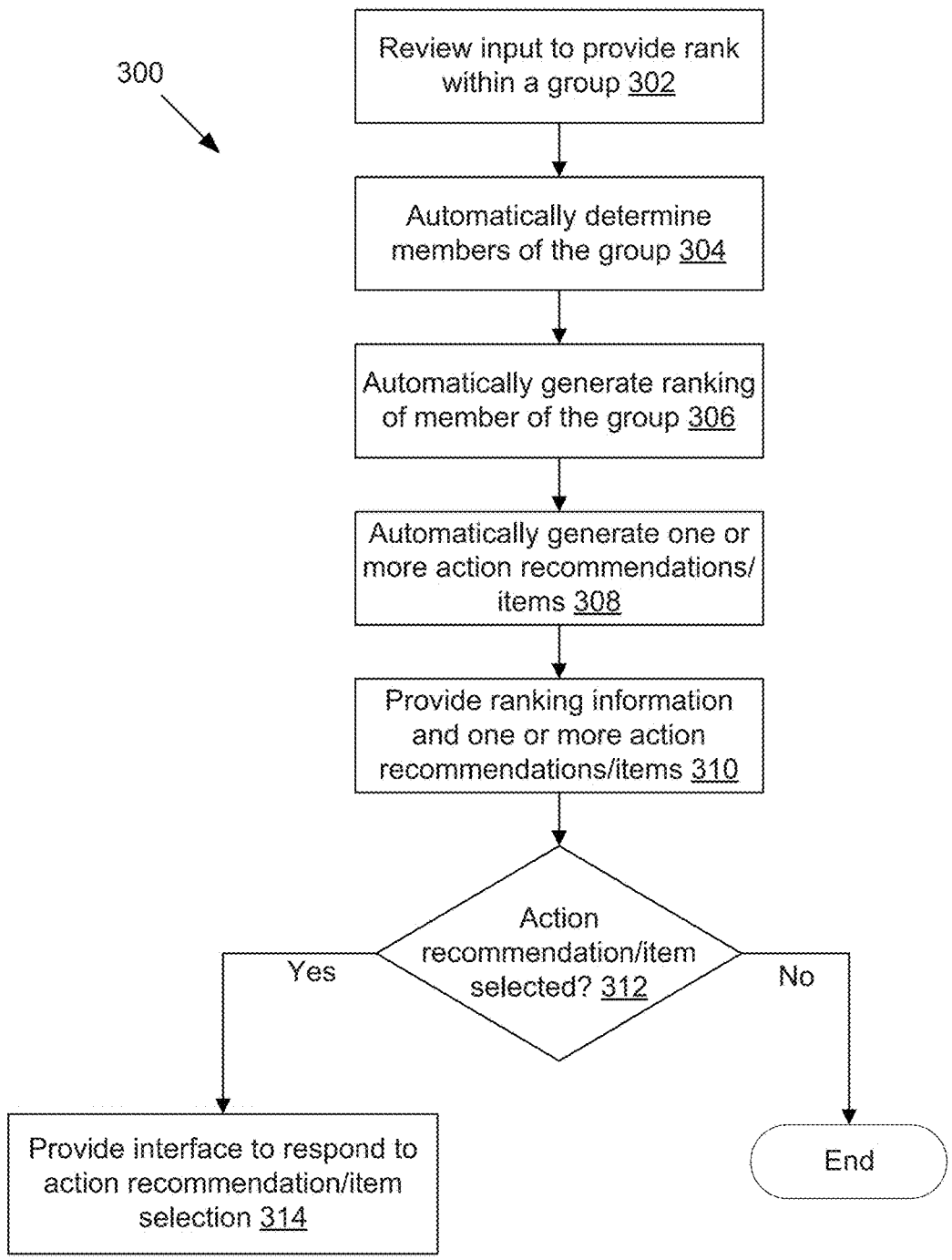
FIGS. 3, 4A-4C, and 5A-5B illustrate example flows for determining and providing user's rank and action recommendations/items according to some embodiments.

FIG. 3 depicts an example flow 300 for ranking a user within a group and providing one or more action recommendations or items, according to some embodiments. FIGS. 4A-4C and 5A-5B depict examples of additional flow diagrams detailing one or more portions of flow 300. FIG. 3 is described in detail below in conjunction with FIGS. 4A-4C and 5A-5B. In an embodiment, each of the processes described in connection with the functional blocks of FIGS. 3, 4A-4C, and 5A-5B may be implemented using one or more computer programs, other software elements, and/or digital logic in any of a general-purpose computer or a special-purpose computer, while performing data retrieval, transformation and storage operations that involve interacting with and transforming the physical state of memory of the computer. FIGS. 3, 4A-4C, and 5A-5B are described below in conjunction with the components and data of FIG. 2, according to an embodiment. Flow 300 depicts example techniques corresponding to a particular user. The process of flow 300 can be repeated for each of a plurality of users, for each particular group for which the particular user is a member, and/or at different points in time for the same or different particular user or particular group.

In block 302, the user interface component 200 receives input from a particular user, at a client 106, to initiate ranking the particular user within a group. Input may comprise one or more indications to perform ranking operations including, but not limited to, log in information, authentication information, specifying a particular group (e.g., a connections group, a company or co-worker group, a professional peers group), navigating to a ranking page, requesting ranking information, or the like.

In alternative embodiments, block 302 may be optional. For example, if a unique user profile (in user profiles store 212) associated with the particular user is known by system 100 and the system 100 is configured to automatically provide ranking(s) associated with the particular user, it may be unnecessary for the particular user to provide input to obtain ranking information.

Next, in block 304, the group determination component 202 automatically determines or identifies the users or members constituting a particular group, of which the particular user is a member. The particular group is the group specified in block 302 or may be pre-selected by system 100. Examples of a particular group include, but are not limited to, a connections group, a company or co-worker group, a professional peers group, a professional peers within your company group, a school or classmates group, any professional context group, any group that may be formulated based on user profile or associated information, any group where similar type of information across a plurality of users is known, or the like.

Figure 4A:
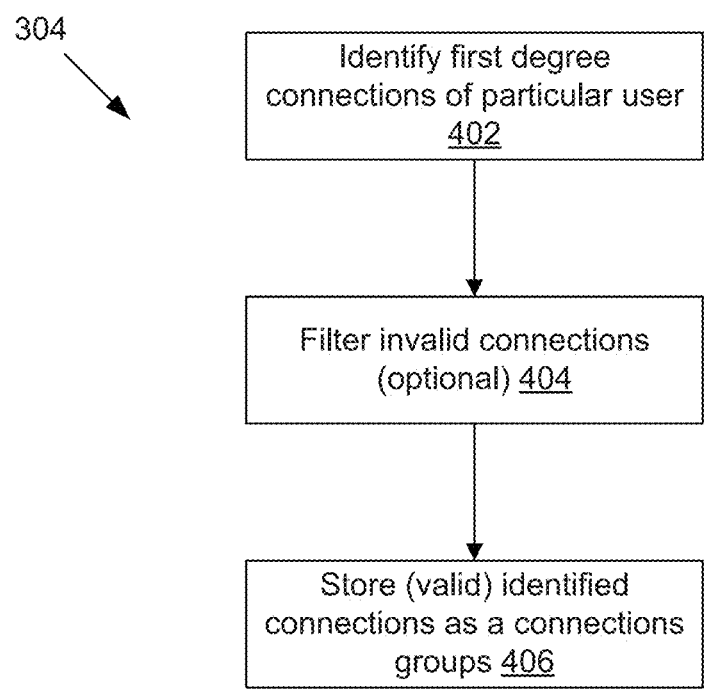

Depending in the particular group for which the ranking will be calculated, different group identification techniques may be applicable. In an embodiment, a group identification technique depicted in FIG. 4A is performed in connection with the particular group being a connections group. The connections group, also referred to as a "your connections" group, comprises the particular user and other users that have a first degree connection to the particular user. Each of the particular user and such other users has a user profile in the user profiles store 212.

In a block 402 of FIG. 4A, the group determination component 202 identifies each of the users having a first degree connection to the particular user using the information included in the user profiles store 212. Each first degree connection comprises a mutually acknowledged or confirmed direct connection or relationship between the particular user and another user, in which both users have respective user profiles in the user profiles store 212. For example, the particular user may have sent a connection request to another user (e.g., a friend, a colleague, a classmate, a co-worker, a neighbor, etc.) and the other user confirmed the connection request, thereby establishing a first degree connection between the particular user and the another user. In an embodiment, each user that establishes an account or subscribes to a website, network, application, social media network or service, repository, or the like can have a corresponding user profile in the user profiles store 212. The user profile information may be self-reported by respective users and/or obtained by system 100 based on user activity. Each user profile includes the user's name and professional, work, career, academic and/or bibliographical information, such as information that may be included in a work resume. Each user profile, or additional information associated with the user profile, also includes a variety of other information corresponding to the respective user such as, but not limited to, contact information (e.g., email address, phone number), photograph of the user, relationships or connections to one or more other users (e.g., first degree connections), user commentary, user provided information, user preferences, user settings, and the like.

Next in a block 404, the group determination component 202 in conjunction with the group security check component 204 filters out or checks for invalid or improper first degree connections from those identified in block 402. One or more security checks may be performed to check for fake or untrustworthy user profiles or accounts, because such "bad" user profiles may, in turn, be indicative of "bad" first degree connections. Example checks include, but are not limited to: whether a significant or threshold number of user profiles associated with the first degree connections were all recently created (e.g., indicative of fake user profiles created to increase first degree connections), the health of the user profiles (e.g., whether the user profiles are regularly updated or accessed by the respective users), whether email confirmation process was satisfied when a user profile was created, a history of "bad" activity (e.g., spamming, suspicious profile content, etc.), or the like. Alternatively, block 404 may be optional. If security checks are separately performed, for example, in connection with setting up an account, subscribing, signing up, and/or providing a user profile to system 100, then block 404 may not be required.

In some embodiments, the maximum number of identified first degree connections may be limited to a certain number (e.g., 500 connections), the maximum number of allowed first degree connections for each user may be limited by the server 102 to a certain number (e.g., 500 connections), and/or a subset of the first degree connections (e.g., the highest quality first degree connections) may be deemed to be the identified first degree connections of the particular user.

Once the (valid) first degree connections are identified, the group determination component 202 stores such information in groups and rankings store 220, in a block 406. The stored information may comprise identifiers of each of the (valid) first degree connections, an identifier of the particular user, an identifier that the group is a connections group associated with the particular user, a time/date stamp, and other information associated with specifying the members making up the connections group for the particular user at a particular point in time. As described in more detail below, because historical ranking trends and changes may be provided, system 100 keeps track of when the ranking and group determinations occur.

Figure 4B:
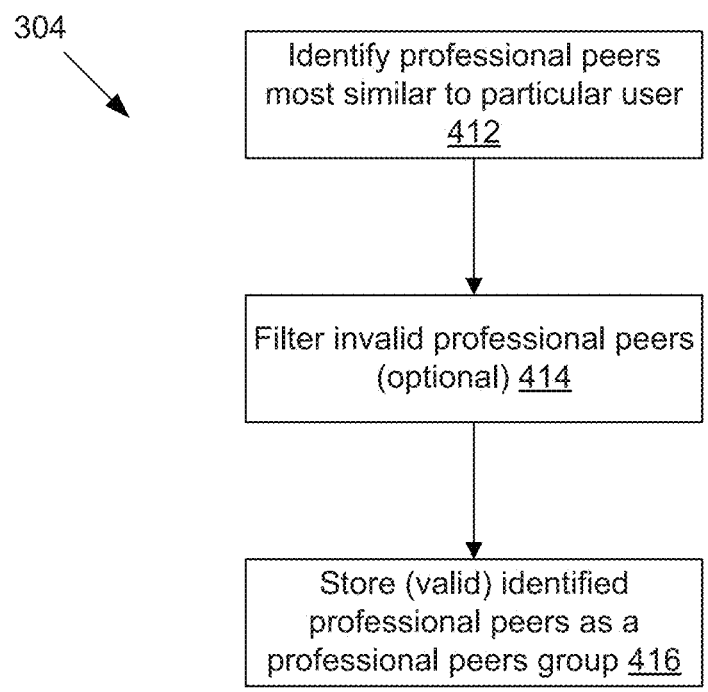

In another embodiment, a group identification technique depicted in FIG. 4B is performed in connection with the particular group being a professional peers group. The professional peers group, also referred to as a "professionals like you" group, comprises the particular user and other users that are the most similar in a professional context to the particular user. Each of the particular user and such other users has a user profile in the user profiles store 212.

In a block 412 of FIG. 4B, the group determination component 202 determines users identified in the user profiles store 212 that are the most similar professionally or from a work perspective to the particular user. The professionally similar users may be limited to a certain or pre-set number (e.g., 100). Additionally, the professionally similar users may be limited to a certain segment of users, such as users within 5 years of age of the particular user, users who live within the same country/city, and/or users who work in the same industry. The most professionally similar users to the particular user are identified based on respective profile similarity scores in the profile similarity scores store 218. A profile similarity score, also referred to as a similar profile score or similar profile ranking, comprises a computed metric of how similar one user profile is to another user profile based on factors such as, but not limited to, work title, geographical location, industry, education, skills, etc. Profile similarity scores are described in detail in U.S. patent application Ser. No. 14/528,643 filed on Oct. 30, 2014 entitled "Temporal-Based Professional Similarity," which is incorporated by reference herein in its entirety.

In a block 414, the group determination component 202 in conjunction with the group security check component 204 may filter, check, or otherwise modify the set of professionally similar users identified in block 412. As an example, check(s) for fake or untrustworthy user profiles may be performed to find fake/untrustworthy professionally similar users, similar to the discussion above in connection with block 404. As another example, additional refinement of the identified professionally similar users may occur to take into account particularities of certain professions or other criteria. Alternatively, block 414 may be optional if there are no "tweaks" to be made to the users identified in block 412.

Once the (valid) most professionally similar users are identified, the group determination component 202 stores such information in groups and rankings store 220, in a block 416. The stored information may comprise identifiers of each of the (valid) professionally similar users, an identifier of the particular user, an identifier that the group is a professional peers group associated with the particular user, a time/date stamp, and other information associated with specifying the members making up the professional peers group for the particular user at a particular point in time. As described in more detail below, because historical ranking trends and changes may be provided, system 100 keeps track of when the ranking and group determinations occur.

Figure 4C:
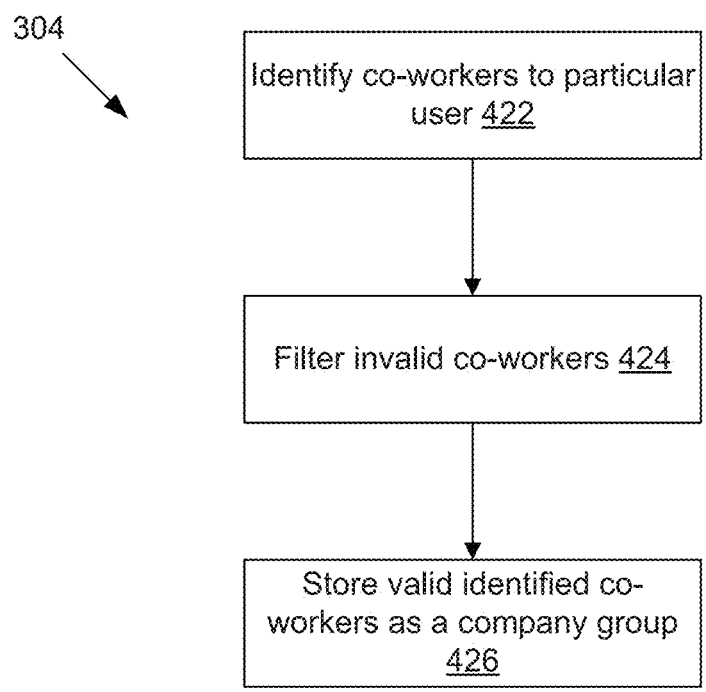

In yet another embodiment, a group identification technique depicted in FIG. 4C is performed in connection with the particular group being a company or co-worker group. The company group, also referred to as a "your company" group, comprises the particular user and other users that currently work for the same company, entity, or employer as the particular user. Each of the particular user and such other users has a user profile in the user profiles store 212.

In a block 422 of FIG. 4C, the group determination component 202 identifies users who currently work for the same company, entity, or employer as the particular user based on employer affiliation information included in the respective user profiles of the user profiles store 212.

In a block 424, group determination component 202 and group security check component 204 perform filtering operations to identify and exclude any co-workers identified in block 422 who do not actually work for the same employer as the particular user (e.g., filter out invalid or fake co-workers). Because user profiles may be populated by the users themselves, opportunities exists to submit false or fake information to, for example, artificially increase user profile visibility. For each of the identified co-worker users, one or more checks are performed to confirm whether a given co-worker user is employed by the same employer as the particular user including, but not limited to:

Confirm the given user's work email address, if the work email address is known.
  Confirm the given user's work IP address, if the work IP address is known.
  Check the given user's first degree connections for trusted connection(s): Whether the given user has at least one first degree connection with another user who is deemed to be a trusted connection person. A trusted connection person is a person known to work for the same company as the given user (and by extension, also the particular user). For example, the trusted connection person may be the company's CEO and such information is public knowledge. As another example, the trusted connection person may have a confirmed work email address.
  Check the given user's first degree connections for a threshold number of connections: Whether the given user has a threshold number of first degree connections with other users whose user profiles indicate that they are currently working for the same company as the given user. If there is sufficient connection density among users purported to work for the same company, then there is a higher chance that the employer affiliation is accurate.
  Check the given user's professional network (e.g., first, second, and third degree connections) to see whether anyone in his/her professional network ranks among the top 10 in the company. As an example, top ranking users tend to be executives of the company and having such person(s) within the given user's professional network tends to validate the employee affiliation of the given user.

One or more checks performed as discussed in connection with blocks 404 and/or 414.

Other direct or indirect security checks based on available information about the given user and/or other user(s).

In alternative embodiments, if current employer information was previously confirmed, for example, at the time the information was added to the given user's user profile, then block 424 may be omitted or be optional.

Once the fake or suspected fake co-workers are excluded, the remaining co-workers comprise the valid or confirmed identified co-workers for the particular user. In a block 426, the group determination component 202 stores information about the valid identified co-workers in groups and rankings store 220. The stored information may comprise identifiers of each of the valid co-worker users, an identifier of the particular user, an identifier that the group is a company group associated with the particular user, a time/date stamp, and other information associated with specifying the members making up the company group for the particular user at a particular point in time. As described in more detail below, because historical ranking trends and changes may be provided, system 100 keeps track of when the ranking and group determinations occur.

Although not shown in FIGS. 4A-4C, if invalid, improper, fake, or suspicious information is detected in a user profile in the course of determining members of a particular group for the particular user, one or more logs, reports, flags, or other indicators may be generated for further action.

Returning to FIG. 3, once members of the particular group are known, ranking component 206 automatically ranks members of the particular group relative to each other in a block 306. In an embodiment, rankings are determined in accordance with a number of valid unique user profile views per day per unique viewer of respective user profiles corresponding to members of the particular group. The greater the profile views number or count corresponding to a given user profile, the higher the ranking of that user profile relative to other user profiles in the group.

Figure 5A:
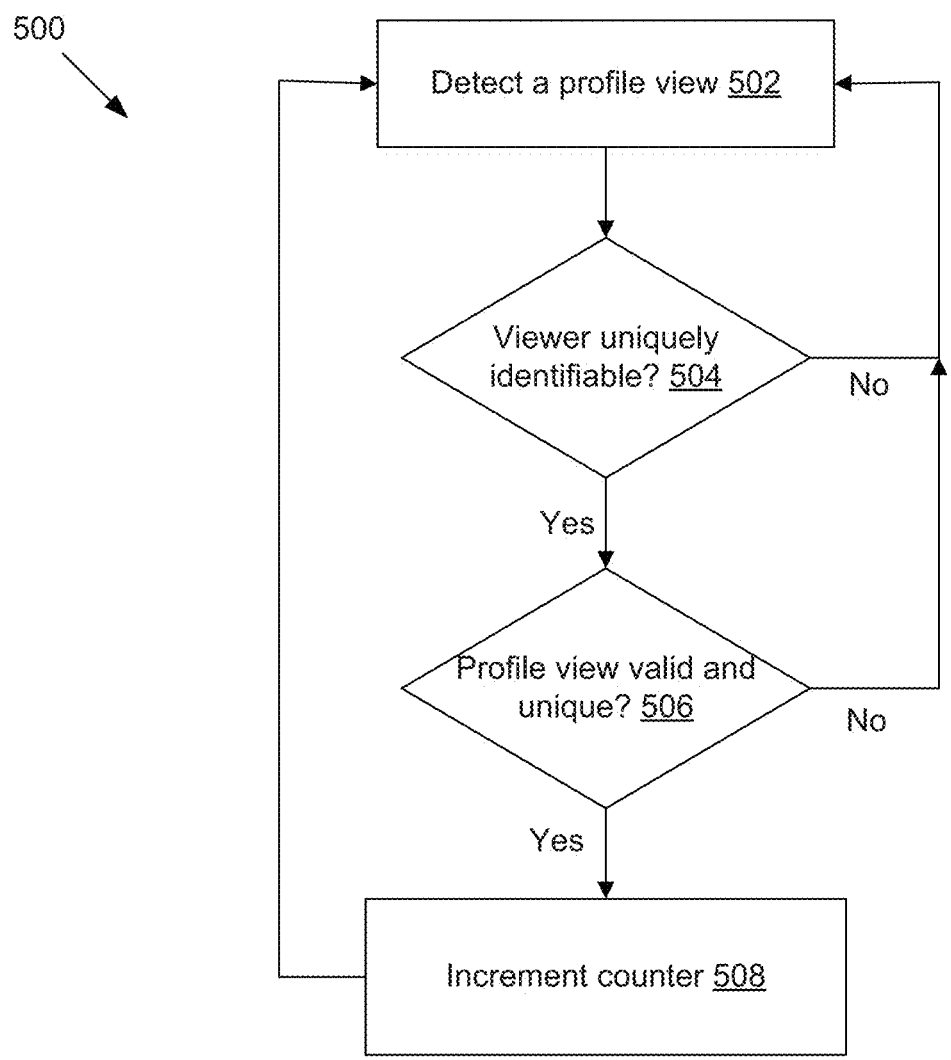

Flow 500 depicted in FIG. 5A provides details regarding how profile views are counted, according to some embodiments. Flow 500 is performed on a continual (or near continual) basis in order to maintain a count of profile views of every user profile in the user profiles store 212. In a block 502, profile view count component 208 detects a profile view. In an embodiment, the website (e.g., a social or professional network) or server (e.g., server 102) hosting the user profiles in the user profiles store 212 logs user profile access activities. A user profile can be accessed directly from the hosting website or server and/or indirectly on third party websites or servers via APIs (e.g., another server not shown in FIG. 1). For example, a third party website may provide news articles or news feeds that mention a certain person. A link to the certain person's user profile stored in the user profiles store 212 may be included in the news article or news feed. Alternatively, the certain person's user profile stored in the user profiles store 212 may be obtained from the user profiles store 212 and included in the news article or news feed. The number of times the news article/feed is viewed, especially if the third party hosting the news article/feed does not access the website or server hosting the user profile, may be used as a proxy for a number of views of the user profile.

The user profile access log includes various information associated with each user profile access including, but not limited to, a time/date stamp, user profile identifier, identifier of the user that accessed the user profile (referred to as the viewer or user profile viewer), requesting server/website identifier, and the like. The user profile access log may be maintained independent of the ranking techniques described herein or specifically for ranking purposes. Profile view count component 208 can use the user profile access log to detect when a user profile has been accessed (e.g., "viewed").

Next, at a block 504, profile view count component 208 determines whether the viewer of the user profile detected in block 502 is uniquely identifiable. For example, if the viewer is logged into the website or server hosting the user profiles, then the viewer is uniquely identifiable. If the viewer is not uniquely identifiable (no branch of block 504), then the flow 500 returns to block 502 to detect the next user profile view. Without the ability to uniquely identify the viewer, it is not possible to know whether a same user or a program or script is repeatedly accessing the same user profile to artificially inflate that user profile's view count. For this reason, a user profile accessed by an unknown viewer may not count as a valid unique profile view.

If the viewer is uniquely identifiable (yes branch of block 504), then the flow 500 proceeds to a block 506. In block 506, profile view count component 208 further determines whether the profile view is valid and unique. Examples of invalid or improper profile views include, but are not limited to: a user viewing his or her own user profile (e.g., self-viewing), a user's first degree connections repeatedly viewing the user's user profile, the user's co-workers repeatedly viewing the user's user profile, repeated viewing of a user profile using an automated technique (e.g., a program or script), viewing of different user profiles by an automated technique (e.g., a program or script), or other suspicious view "stuffing" actions. In an embodiment, if a particular viewer views a particular user profile more than once in a given day, all of the views for the given day count as a single unique view.

If the profile view is determined to be invalid and/or not unique (no branch of block 506), then flow 500 proceeds to block 502 to detect the next profile view. And the detected profile view is not counted for ranking purposes. Otherwise, the profile view is determined to be valid and unique (yes branch of block 506), and flow 500 proceeds to block 508.

In block 508, a profile view counter in the profile view counters store 214 corresponding to the user profile is incremented. In an embodiment, the profile view counter may be a daily counter and a different counter can exist for each day within a pre-set period of time (e.g., last 30, 45, 60, or other number of days) for a given user profile. In some embodiments, different weights may be assigned to a profile view depending on where the profile view originated. For example, because user profiles displayed in news feeds may not necessarily be actually viewed, user profiles accessed from third party websites or servers may be given a lower weight than user profiles accessed directly from the hosting website or server.

After the counter is incremented, flow 500 returns to block 502 to detect the next profile view.

Figure 5B:
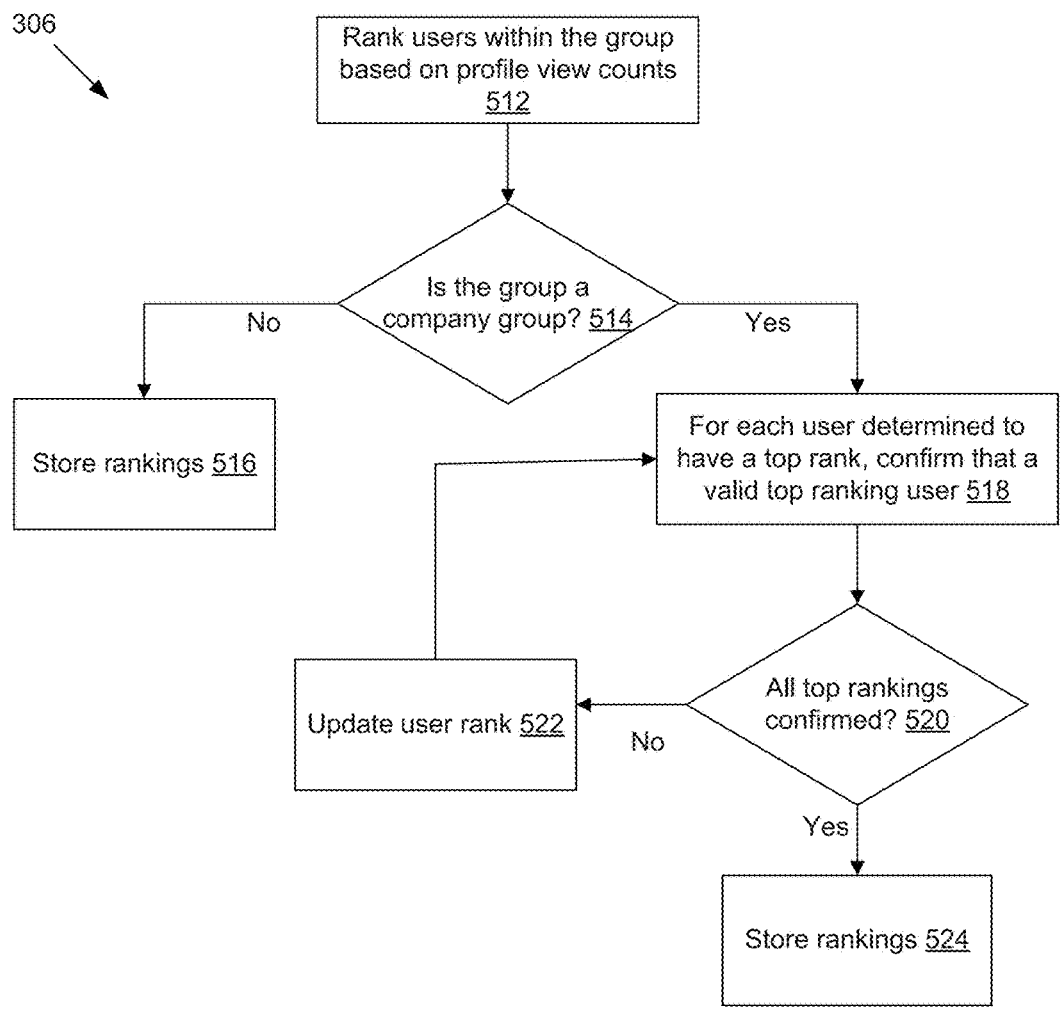

These profile view counts are used to rank users as described in detail in FIG. 5B. In a block 512 of FIG. 5B, ranking component 206 ranks the members/users of the particular group relative to each other based on the members' respective profile view counts. Typically, the greater a member's profile view count, the higher that member is ranked. The rankings may be a daily ranking—based on profile view counts for a given day. Alternatively, the rankings may be based on a profile view counts for a time period that is less than a day, more than a day, a week, a month, or any other specified time period.

In some embodiments, a time delay may be implemented before a new user profile is ranked. For example, a time delay of three days may be imposed to gather the necessary data, conduct one or more security checks on the gathered data, and to perform other screens before a new user profile is deemed ready for use.

Next in a block 514, ranking component 206 checks whether the particular group for which rankings were determined in block 512 is a company group. If the particular group is not a company group (no branch of block 514), then the rankings from block 512 are stored in the groups and rankings store 220 (block 516). Otherwise, because the particular group is a company group (yes branch of block 514), a final security check is performed, in block 518, before the rankings of block 512 are deemed to be final.

In block 518, ranking component 206 in conjunction with the group security check component 204 performs an additional check on each top ranking member/user within the particular group to confirm that they are valid top ranking members/users. For each top ranking member, check whether a threshold number of users in a given member's network—the given member's first degree, second degree, and third degree connections—ranks in the top pre-set number (e.g., top 100 or another number depending on the size of the company) within the same company group. In an embodiment, the top ten ranking members are checked. In other embodiments, fewer or more than top ten ranking members can be checked depending on the size of the company of the company group. Likewise, the top pre-set number scales to the size of the company. For example, companies can be classified as a small, medium, or large company.

This check looks for good connection density by the purported top ranking member with other users who are ranked relatively high within the same company to ensure that each purported top ranking member actually works at the company for which the member is determined to be a top ranker.

If all of the initially computed top ranking members/users are confirmed to be valid top ranking members (yes branch of block 520), then all of the rankings for the company group are stored in the groups and rankings store 220 in block 524.

If one or more of the initially computed top ranking members/users are found to be invalid or improper top ranking members because the security check of block 518 is not satisfied (no branch of block 520), then the rankings computed in block 512 are updated accordingly in block 522. As a given purported top ranking member is excluded as a top ranking member, the member ranked just below the top ranks becomes a new purported top ranking member. The new purported top ranking member is checked (just as all the other purported top ranking members are checked) in block 518. This iteration may occur one or more times until all of the purported top ranking members pass the security check of block 518.

Returning to FIG. 3, at a block 308, action recommendations or items components 210 automatically generates or selects one or more action recommendations or items, from among items included in the action recommendations or items store 216, to provide in connection with the ranking information. Action recommendations or items, also referred to as action cards, comprise specific suggested actions or tools that are known or likely to increase a user's profile views. Action recommendations or items and their selection are described in detail in U.S. patent application Ser. No. 14/144,051 filed on Dec. 30, 2013 entitled "System and Method for Recommending Actions on a Social Network," which is incorporated by reference herein in its entirety.

In an embodiment, action recommendations/items to be provided to the particular user can differ depending on the account type associated with the particular user. For example, the particular user can have a free account or premium/paid account with the website or server providing the rankings. Examples of action recommendations/items for free accounts include, but are not limited to: update your summary, add a profile photo, share an article, join a group, add skills, upsell to a premium account, preview premium profile, and the like. Examples of action recommendations/items for premium accounts include, but are not limited to: update your summary, update your profile photo (if photo hasn't been changed in a year), update your headline (if it hasn't been changed in last six months), share an article, join a group, add skills, see/add top keywords to your user profile, get an open profile, have access to blog posts, expanded search capabilities, all the free account action recommendations/items, other premium account features, and the like.

Next, in a block 310, the user interface component 200 provides ranking information and one or more action recommendations/items for display on the ranking requesting device (e.g., to the particular user interfacing with the client 106). Ranking information includes, but is not limited to, the particular user's rank within the particular group, at least partial user profiles of top ranked users within the particular group, at least partial user profiles of users ranked above and below the particular user, and the particular user's ranking history or trend. Action recommendations/items include items discussed above in connection with block 308. As discussed in detail below, the ranking information and action recommendations/items provided to the particular user is customized in that the presentation takes into account the particular user's account type (e.g., free account, premium/paid account), the particular group specified, and user preferences or settings of the other users comprising the particular group (e.g., user privacy settings).

Users submit user profiles to be viewed by others. Each viewing of a given user profile is an incremental opportunity for the user to grow his or her career when the user profile includes work or professional information about the user. Ranking users based on the number of viewing of their user profiles indicates the users' visibility and reminds users to improve their profiles to improve their visibility. Action recommendations and items provide specific suggestions for how to improve their visibility—by improving their profiles in specific ways and/or taking other related actions.

Figure 6A:
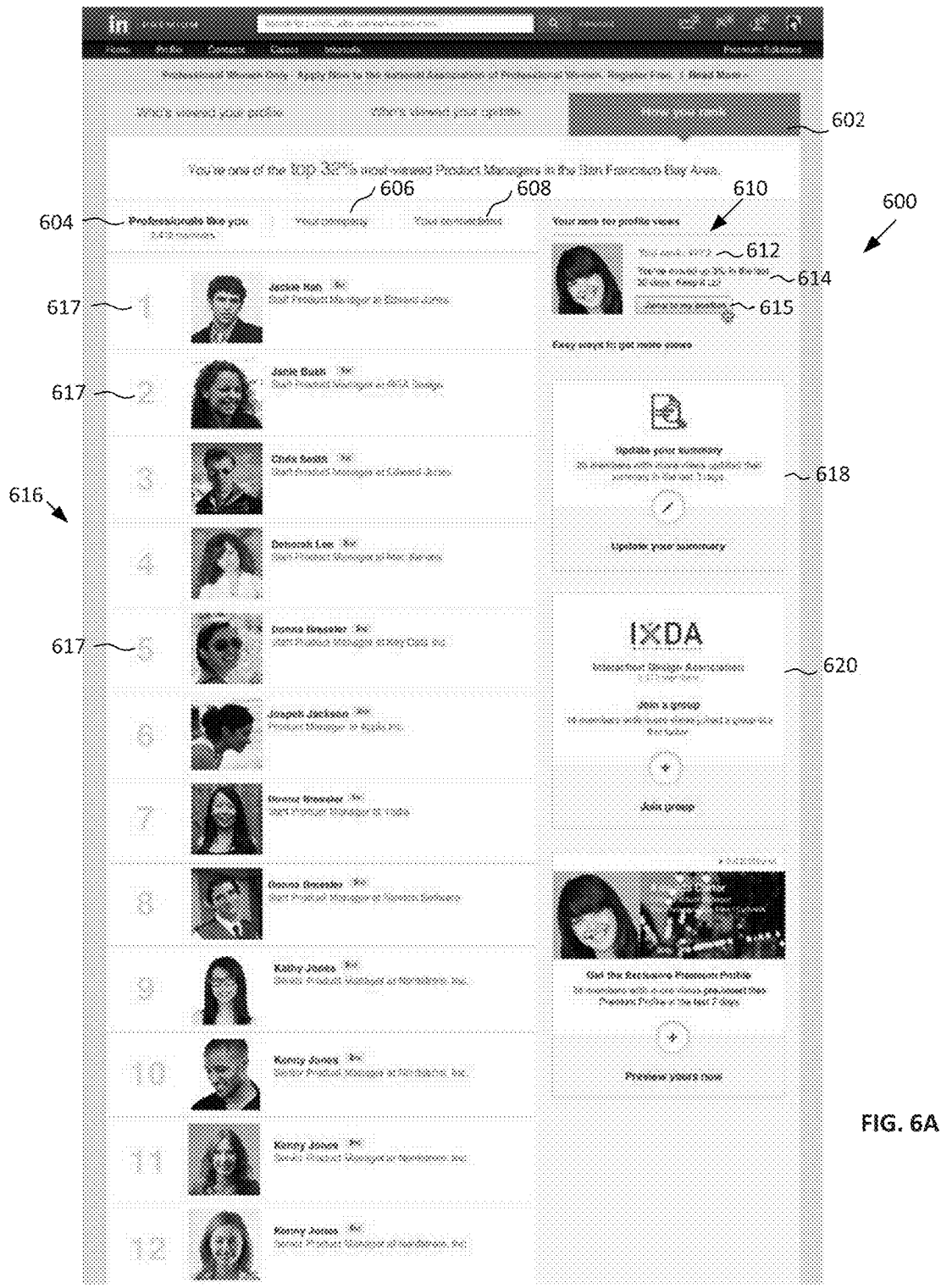
FIGS. 6A-6E illustrate example screens or screenshots displaying ranking information and/or action recommendations/items according to some embodiments.

FIGS. 6A-6D depict screens displaying example ranking information and action recommendations/items for a particular user, according to some embodiments. FIG. 6A depicts a screen 600 including a "How you rank" tab 602 that has been actuated to show rankings and action recommendations/items. Screen 600 further includes the following group tabs: "Professionals like you" group tab 604, "Your company" group tab 606, and "Your connections" group tab 608. As shown, the "Professionals like you" group tab 604 has been selected in screen 600. Ranking information 610 about the particular user as a member of her "Professionals like you" group is presented. Ranking information 610 includes, but is not limited to, the particular user's numerical rank 612 (e.g., ranked 772 out of 2,412 members), the particular user's ranking history or trend 614 (e.g., moved up 3% in the last 30 days), and an icon 615 to jump to the particular user's rank position within a ranked list 616 on the left side of the screen 600.

In an embodiment, ranking information 610 may include an indicator showing what action the particular user performed (e.g., from previously provided action recommendations/items) and the action's impact on the particular user's rank. In an example, ranking history or trend 614 may be more granular to demonstrate actual cause-and-effect linkage between acting on a particular action recommendation/item and the resulting change (e.g., increase) in profile views attributable to following through on the recommendation. The particular user can see which actions have a positive impact on increasing his/her visibility and/or that certain actions result in a higher visibility boost than other actions.

Top ranked users 617 within the ranked list 616 are shown in screen 600. For each member within the ranked list 616 shown in screen 600, information such as the member's numerical rank, photo, name, job title, and company are provided. Such information may comprise a portion of the member's user profile. Action recommendations/items for the particular user include an "Update your summary" action card 618 and a "Join a group" action card 620.

Figure 6B:
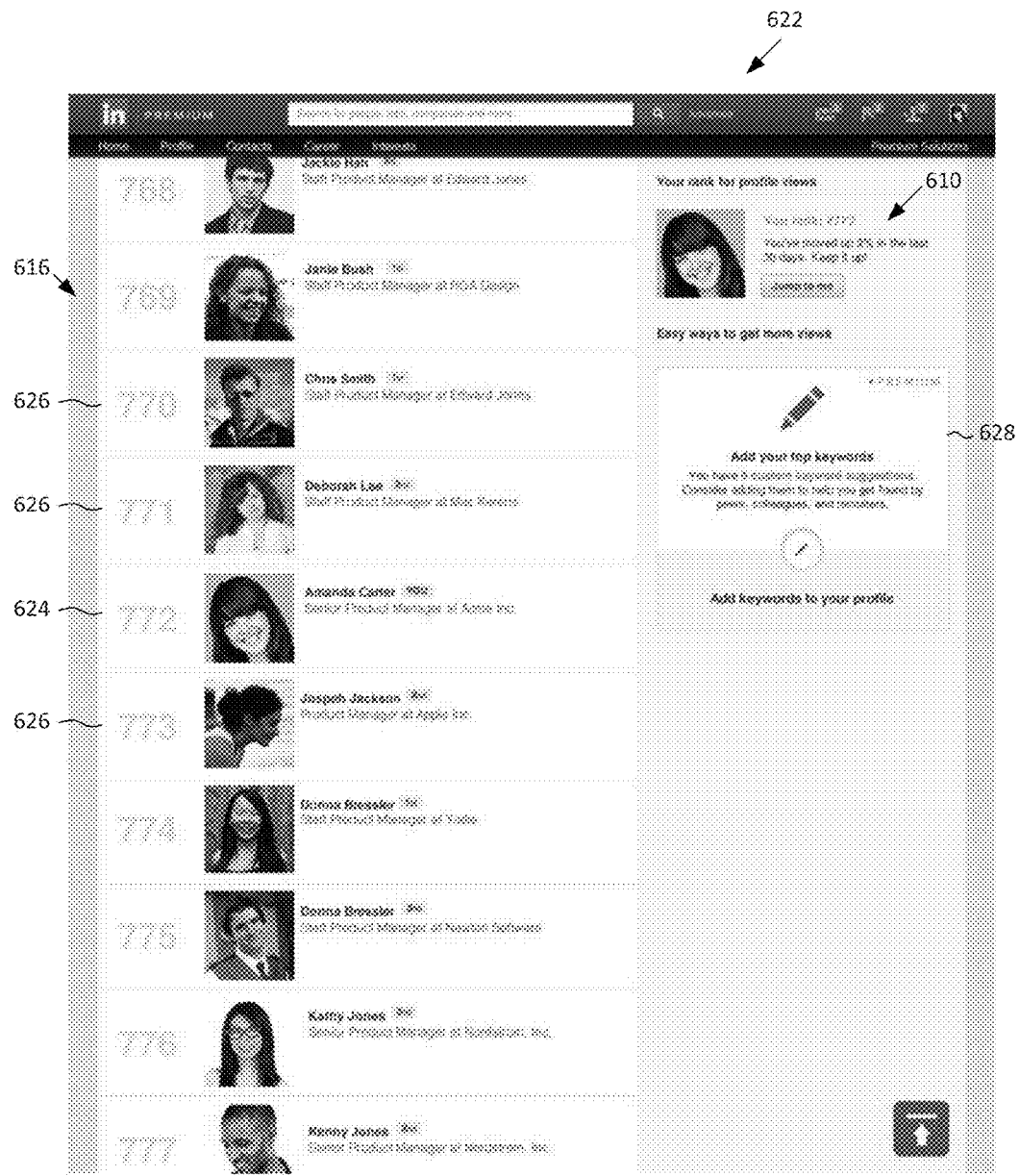

If the particular user actuates the jump icon 615, a screen 622 of FIG. 6B is shown, in an embodiment. On the left side of screen 622, a portion of the ranked list 616 comprising the particular user rank 624 and the particular user's surrounding ranks 626 is displayed. Additional action recommendations/items are also provided on the right side, such as an "Add your top keywords" action card 628 (e.g., keyword suggestions to add to the particular user's user profile).

Figure 6C:

In an embodiment, different portions of the ranked list are presented to the particular user depending upon whether the particular user has a free account or premium account. As an example, the top 50 ranks and the 50 surrounding ranks to the particular user's rank are provided if the particular user has a premium account, or the top 10 ranks and the 10 surrounding ranks to the particular user's rank are provided if the particular user has a free account. The different treatment between free and premium accounts is shown in FIGS. 6A-6C. FIGS. 6A-6B shows rankings for a premium account user. In contrast, FIG. 6C shows rankings for a free account user.

In FIG. 6C, a screen 630 shows the same "Professionals like you" group rankings for the same particular user as in FIGS. 6A-6B except that the particular user is a free account user. As with the premium account, particular user ranking information 632 is provided, similar to the ranking information 610. A ranked list 634, is also similar to the ranked list 616, except the top ranks 636 is limited to the top 10 ranks. To see more of the ranked list 634, an upsell icon 638 is provided to upgrade to a premium account. Action recommendations/items 640 are also provided, which may differ from the action recommendations/items for the premium account.

If the particular user actuates any of the other group tabs (e.g., tab 606 or tab 608), information similar to that shown in FIGS. 6A-6C for the "Professionals like you" group is likewise shown in accordance with the selected group (e.g., "Your company" group, "Your connections" group). In an embodiment, if any members in the ranked list opted out of the ranking feature or specified a privacy setting that precludes display of his/her user profile for ranking purposes, then such members are included for purposes of determining rankings. However, his/her user profile information will not be displayed in the ranked list and instead generic or anonymous information may be displayed instead. In an embodiment, certain ranking groups may be available to premium account users only. For example, the "Professionals like you" group may not be a group option for the particular user who has a free account. In an embodiment, ranking information and/or action recommendations/items can be displayed in different formats than shown in FIGS. 6A-6C. For example, on mobile devices and/or when accessed using a mobile application, data may display differently in consideration of the smaller display size and/or different user interface requirements.

Figure 6D:
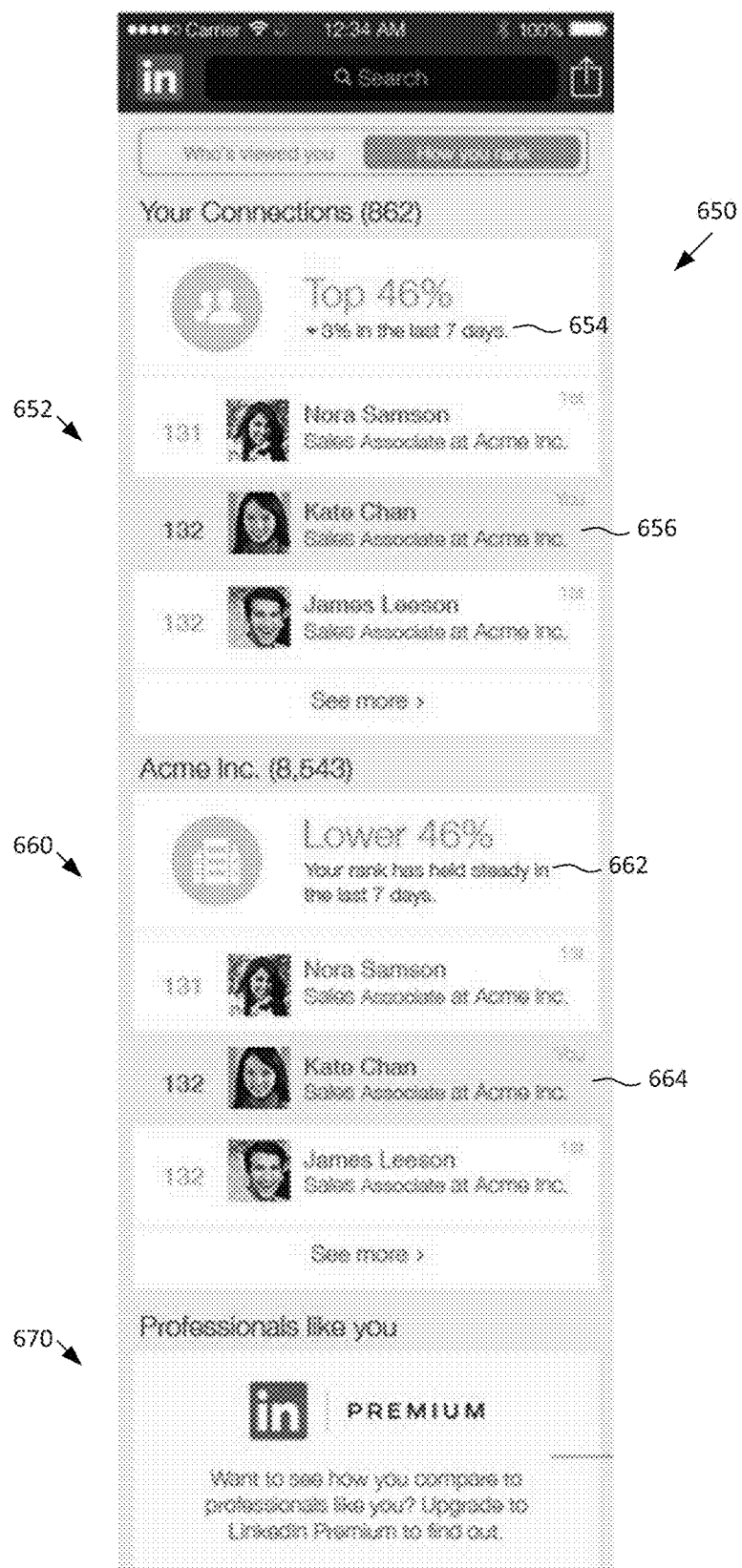

FIG. 6D depicts an alternative presentation of the ranking information, according to some embodiments. In a screen 650, rankings for more than one group are shown—ranked list 652 for the "Your connections" group, ranked list 660 for the "your company" group ("Acme, Inc." group), and an option 670 to upgrade to a premium account to view the rankings in the "Professionals like you" group. Screen 650 may be associated with a mobile device, such as a smart phone, and the particular user has a free account. For the "Your connections" group section, the particular user's ranking history or trend 654, the particular user's rank 656 (e.g., rank 132 out of 862), and the particular user's surrounding ranks are presented. For the "Acme, Inc." group section, the particular user's ranking history or trend 662, the particular user's rank 664 (e.g., rank 132 out of 8,543), and the particular user's surrounding ranks are presented.

Figure 6E:
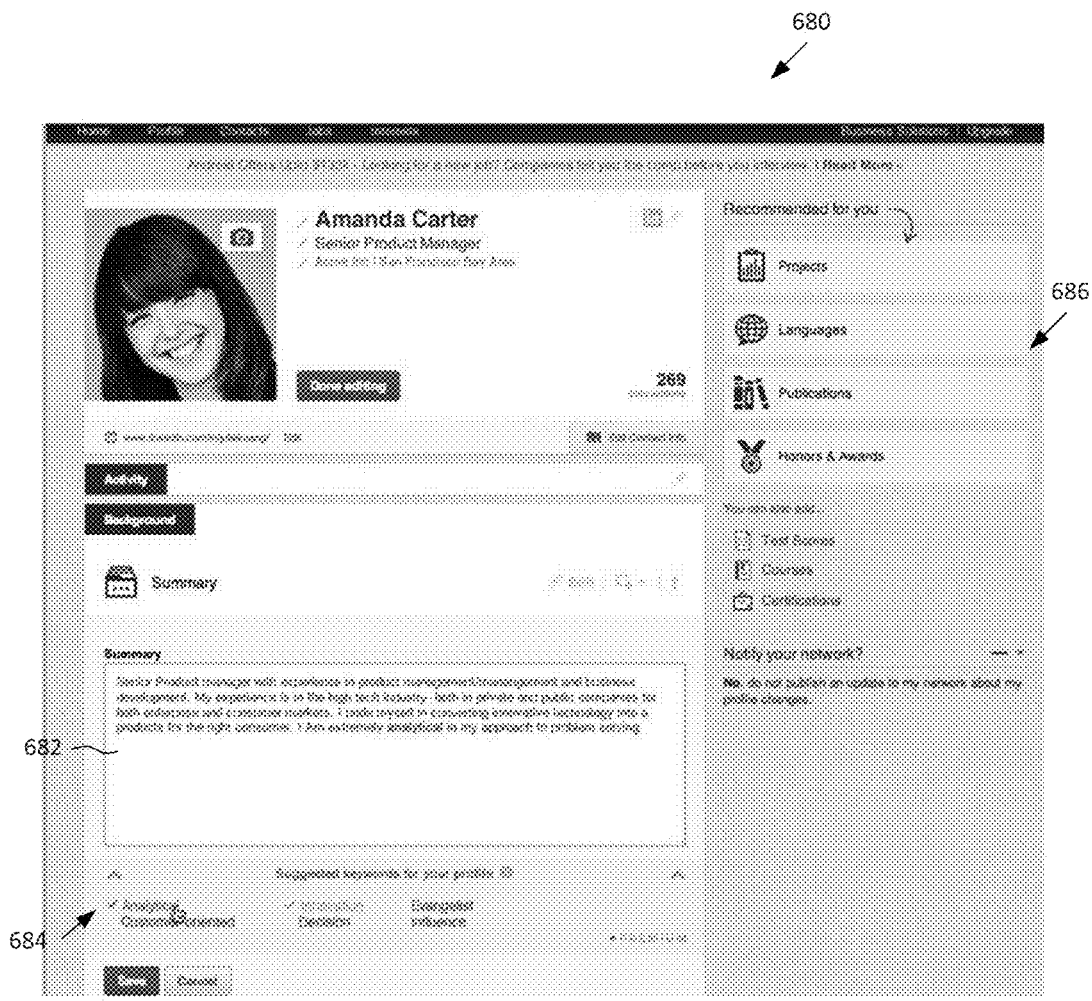

Returning to FIG. 3, if the particular user indicates an interest in acting on a particular action recommendation/item (e.g., clicks or taps on a particular action card) from among those presented in block 310 (yes branch of block 312), then user interface component 200 is responsive to the request and provides an appropriate interface in block 314. FIG. 6E depicts an example screen 680 provided to the particular user in response to actuation of an "Add keywords" action card (e.g., action card 628 of FIG. 6B). Screen 680 includes a summary field 682 that can be edited or added to update the summary of the particular user's user profile. A plurality of suggested keywords 684 are shown, one or more of which can be added to the summary composed in the summary field 682. If any of the keywords 684 has been added to the summary field 682, inclusion indicator (e.g., check icons) is shown. Screen 680 also includes additional action recommendations/items 686 to the user profile such as, but not limited to, updating or adding projects, languages, publications, honors and awards, test scores, courses, or certifications.

If the particular user does not actuate any of the presented action recommendations/items (no branch of block 312), then flow 300 ends.

In this manner, techniques are provided to rank users within each of one or more professional context groups against global ranking criteria (e.g., count of unique profile views). The global ranking criteria comprise a particular technical implementation to capture Internet or online-specific activity. The techniques further include recommendations or suggestions to improve rank within the Internet or online environment, wherein the recommendations or suggestions are specific to increasing user profile views in an online setting.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
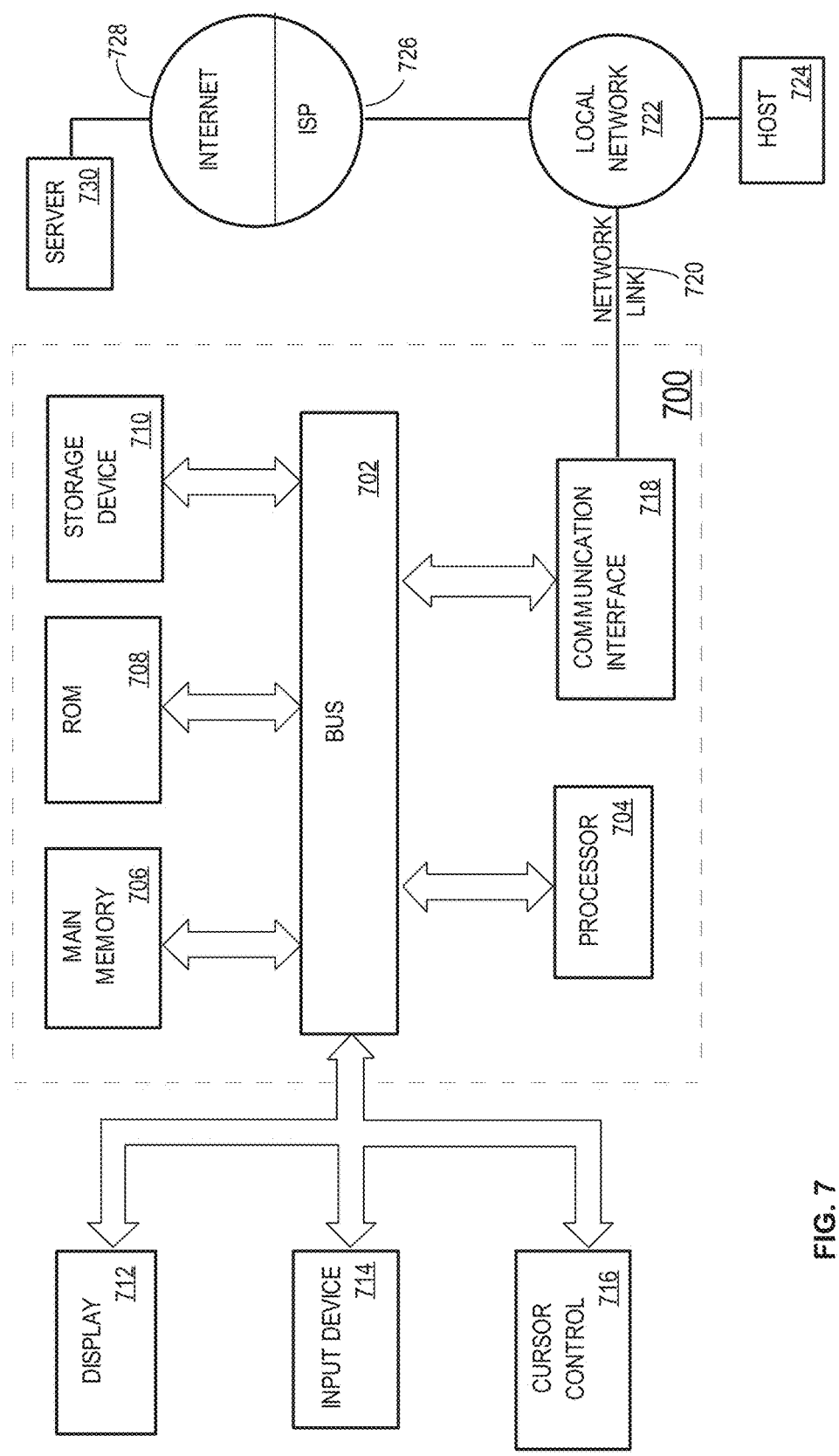
FIG. 7 illustrates a block diagram of an example computer system upon which embodiments of the present disclosure may be implemented.

For example, FIG. 7 is a block diagram that illustrates a computer system 700 upon which an embodiment may be implemented. Computer system 700 may be the server 102, database 104, and/or clients 106. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computerized method, comprising:
   determining a first group of users for which a particular user is a member;
   automatically generating a first ranking of users in the first group;
   automatically generating, for the particular user, one or more first action recommendations to increase rank among the users in the first group;
   automatically providing, to a device accessible by the particular user, (1) a particular ranking of the particular user within the first ranking and (2) the one or more first action recommendations;
   determining a second group of users for which the particular user is a member;
   automatically generating a second ranking of users in the second group;
   automatically generating, for the particular user, one or more second action recommendations to increase rank of the particular user among the users in the second group;
   automatically providing, to the device accessible by the particular user, (3) a second particular ranking of the particular user within the second ranking and (4) the one or more second action recommendations;
   wherein automatically generating the second ranking is based on viewing of user information corresponding to the users in the second group,
   wherein automatically providing includes providing at least a portion of the second ranking other than the second particular ranking.

2. The method of claim 1, wherein automatically generating the first ranking is based on viewing of first user information corresponding to the users in the first group.

3. The method of claim 2, wherein the first user information comprises user profiles corresponding to the users in the first group, each of the user profiles including education information or work experience information.

4. The method of claim 1, wherein automatically generating the first ranking is based on a count per day per unique viewer of user information corresponding to the users in the first group.

5. The method of claim 1, wherein the one or more first action recommendations comprise a particular revision to a user profile, that is viewable by other users, corresponding to the particular user.

6. The method of claim 1, wherein the one or more first action recommendations comprise at least one of updating a summary of a user profile associated with the particular user, adding a photo to the user profile, sharing an article, joining a group, adding skills to the user profile, upselling a premium account, adding keywords to the user profile, updating a headline of the user profile, providing access to blog posts, or expanding search capabilities.

7. The method of claim 1, wherein automatically providing includes providing at least a portion of the first ranking other than the particular ranking.

8. The method of claim 7, wherein the portion of the first ranking other than the particular ranking comprises (a) a certain number of top rankings from among the first ranking or (b) a certain number of rankings immediately above and below the particular ranking.

9. The method of claim 7, wherein the portion of the first ranking other than the particular ranking is based on an account type associated with the particular user.

10. The method of claim 9, wherein the account type comprises a free account or a paid account, and wherein the portion of the first ranking other than the particular ranking is larger when the account type is the paid account than when the account type is the free account.

11. The method of claim 1, wherein the users of the first group comprise first degree connections to the particular user.

12. The method of claim 1, wherein the users of the first group comprise professional peers to the particular user.

13. The method of claim 1, wherein the users of the first group comprise co-workers to the particular user.

14. A computerized method, comprising:
    determining a first group of users for which a particular user is a member;
    automatically generating a first ranking of users in the first group;
    automatically generating, for the particular user, one or more first action recommendations to increase rank among the users in the first group;
    automatically providing, to a device accessible by the particular user, (1) a particular ranking of the particular user within the first ranking and (2) the one or more first action recommendations;
    wherein automatically providing includes providing a ranking trend from a previous particular ranking of the particular user within the first group to the particular ranking of the particular user, the previous particular ranking corresponding to a certain previous time point.

15. The method of claim 14, further comprising:
    determining a second group of users for which the particular user is a member;
    automatically generating a second ranking of users in the second group;
    automatically generating, for the particular user, one or more second action recommendations to increase rank of the particular user among the users in the second group;
    automatically providing, to the device accessible by the particular user, (3) a second particular ranking of the particular user within the second ranking and (4) the one or more second action recommendations.

16. The method of claim 15, wherein automatically generating the second ranking is based on viewing of user information corresponding to the users in the second group, and wherein automatically providing includes providing at least a portion of the second ranking other than the second particular ranking.

17. A system comprising:
one or more processors;
One or more non-transitory computer-readable media storing instructions which, when executed by the one or more processors, cause:
   determining a first group of users that are registered in an online social network, wherein the first group includes a particular user;
   determining access information that indicates, for each user in the first group of users, a number of accesses of a user profile of said each user;
   automatically generating, based on the access information, a ranking for each user in the first group;
   automatically providing, to a device accessible by the particular user, a particular ranking of the particular user within the first group;
   wherein automatically providing includes providing at least a portion of the ranking other than the particular ranking;
   wherein automatically providing includes providing a ranking trend from a previous particular ranking of the particular user within the first group to the particular ranking of the particular user, the previous particular ranking corresponding to a certain previous time point.

18. The system of claim 17, wherein the first group comprises at least one of a professional context group, a first degree connections group, a company group, or a professional peers group.

19. The system of claim 17, wherein the instructions which, when executed by the one or more processors, further cause:
   determining a second group of users that are registered in the online social network, wherein the second group includes the particular user;
   determining second access information that indicates, for each user in the second group of users, a number of accesses of the user profile of said each user in the second group of users;
   automatically generating, based on the second access information, a second ranking for each user in the second group;
   automatically providing, to the device accessible by the particular user, a second particular ranking of the particular user within the second group.

20. The system of claim 17, wherein the user profile includes education information or work experience information.

21. The system of claim 17, wherein the number of accesses of the user profile of said each user in the first group includes access to the user profile from the online social network and access to the user profile from third parties.

22. The system of claim 17, wherein the instructions which, when executed by the one or more processors, further cause:
   automatically generating, for the particular user, one or more first action recommendations to increase the particular ranking among the users in the first group;
   automatically providing, to the device accessible by the particular user, the one or more first action recommendations.

23. The system of claim 22, wherein the one or more first action recommendations comprise a particular revision to the user profile, that is viewable by other users, corresponding to the particular user.

24. The system of claim 17, wherein the portion of the ranking other than the particular ranking comprises (a) a certain number of top rankings from among the ranking or (b) a certain number of rankings immediately above and below the particular ranking.

* * * * *